D. Dunham,
Boring Blind Stiles.
N° 24,427. Patented June 14, 1859.

Witnesses:
Royal Lee
Edwin S. Sweet.

Inventor.
Daniel Dunham.

UNITED STATES PATENT OFFICE.

DANIEL DUNHAM, OF PAWTUCKET, RHODE ISLAND, ASSIGNOR TO D. D. SWEET, JAMES BROMILY, AND E. W. FRENCH, OF SAME PLACE.

MACHINE FOR SPACING AND BORING BLIND-STILES.

Specification of Letters Patent No. 24,427, dated June 14, 1859.

*To all whom it may concern:*

Be it known that I, DANIEL DUNHAM, of Pawtucket, in the county of Providence and State of Rhode Island, have invented a new and Improved Machine for Spacing and Boring Blind-Stiles, &c.; and I do hereby declare that the following is a full, clear, and exact description of the same, reference being had to the accompanying drawings, making a part of this specification, in which—

Figure 1:
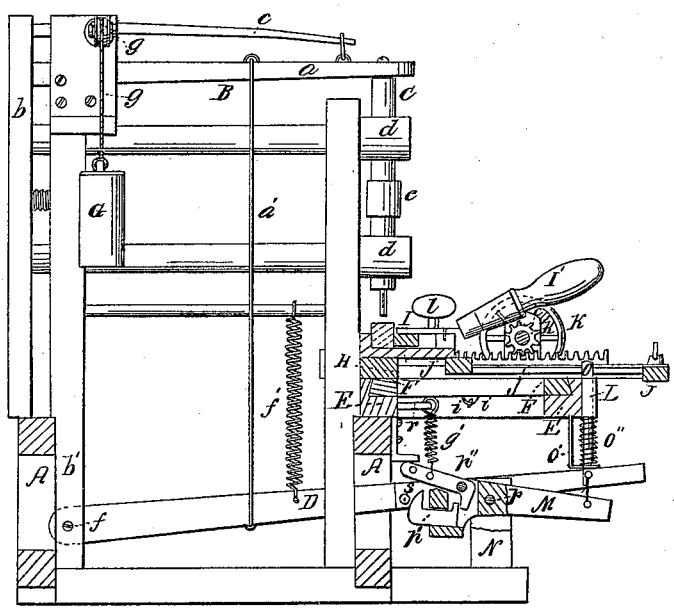
Figure 2:
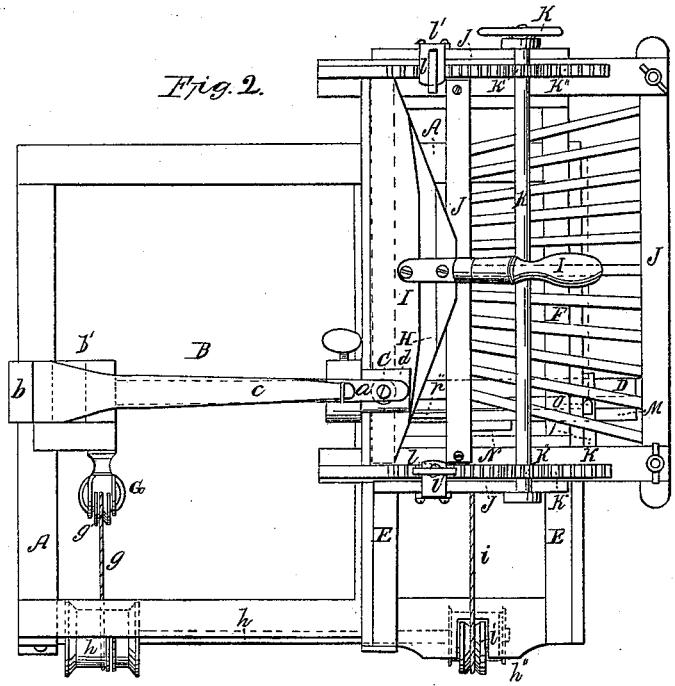
Figure 3:
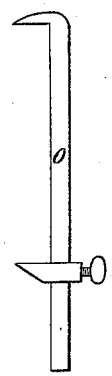

Figure 1, represents a longitudinal vertical section of a machine for spacing and boring blind stiles etc., constructed according to my invention. Fig. 2, is a plan or top view of ditto. Fig. 3, is an elevation of the gage used for setting the machine according to different spaces.

Similar letters of reference indicate corresponding parts in all the figures.

This invention consists in arranging a rack which consists of a series of converging slats, in such relation to the sliding carriage on which the blind stiles or other similar articles are fastened for the purpose of laying out the spaces for holes or mortises, that the length of these spaces can be regulated by moving the rack in or out and that the carriage can be adjusted by means of a suitable gage to correspond to different spaces; and the sliding carriage is arranged in such relation to the boring or mortising machine that by the operation of the treadle which serves to depress the auger or chisel, the dog which retains the rack in its position is released and the rack is allowed to follow the action of a weight and to move for the distance of one space whenever the foot after having depressed the treadle relaxes and leaves the treadle free to fly up by the action of a suitable spring.

To enable those skilled in the art to make and use my machine for spacing and boring blind stiles etc. I will proceed to describe its construction and operation.

Arranged in a suitable frame A, is a boring machine B constructed according to the device of a machine known as Fay's mortising machine, the bore-spindle C being attached to an arm $a$, which is hinged to the standard $b$, and the front end of which is drawn up by a flat spring $c$. The bore-spindle has its bearings in two projections or blocks $d$, and a pulley $e$ serves to give the same a rapid rotary motion, and it is depressed by means of a treadle D, which turns on a pivot $f$ in the standard $b''$, and which connects with the arm $a$ by means of a rod $a'$ and a spiral spring $f'$, serves to pull the treadle up as soon as the foot relaxes.

Secured to the frame A and under the bore-spindle C, are the ways E, on which a carriage F is made to slide backward and forward, and this carriage is subjected to the action of a weight G, which is secured to a rope or cord $g$, which runs over a roller $g'$ to a pulley $h$, which is secured to a shaft $h'$, to the end of which another pulley $h''$, is secured, from which a cord $i$, extends over a roller $i'$, to an eye $i''$, at the under side of the sliding carriage F. This carriage supports a platform H, on which the blind stiles are secured by means of a clamp I, which is operated by a handle I', and which holds the stiles in the proper position for the auger to act. And this carriage itself forms two ways $j$, which are at right angles with the ways E, and which form the guides for a rack J, which is moved toward and from the bore-spindle C, by means of a hand wheel K, which is attached to an arbor $k$, to which two pinions $k'$ are secured, which gear into toothed racks $k''$, which are rigidly attached to the rack J, and which slide in the ways $j$, and two set screws $l$ serve to arrest the rack J in the required position. These set screws screw into angular standards $l'$, which are rigidly attached to the sides of the carriage F.

The rack J consists of a series of slats $j'$ which are at perfectly equal distances one from the other and which converge toward the bore-spindle C, as clearly represented in Fig. 2, so that the spaces between the same become closer and closer as they approach the spindle C. The carriage F, is prevented from following the action of the weight G, by a dog $o$ which slides up and down in a socket L, which is rigidly secured to the outside one of the ways E, and this dog is guided in its motion by a pendant $o'$, and a spiral spring $o''$ presses the same up so that it projects beyond the socket L, and that the same by striking against one of the slats $j'$, of the rack J, prevents the carriage, F, from following the action of the weight G. This dog is connected to a lever, M, which has its fulcrum on a pivot $p$ in a standard N and the inner end of which forms a socket for the sliding nose $p'$, which is pressed out by a spring dog $p''$, which turns on a pivot $q$, and the outer end of which is pulled up by a spring $q'$, which is suspended from an eye $r$, which is rigidly attached to the under side of the inner one of the ways E, and a pin $s$ which extends from the treadle D is in such a position that the same catches under the nose $p'$, whenever the treadle is depressed, and as soon as the foot relaxes and when the treadle flies up by the action of the spring $f'$, the inner end of the lever M is raised by the action of the pin $s$ against the nose $p'$, and the dog $o$ is depressed so that the carriage, F, is allowed to follow the action of the weight G, and the lower end of the nose $p'$ is rounded off in such a manner that the pin $s$ releases the same as soon as the dog $o$ has been sufficiently depressed, and when thus released the dog $o$ flies up again by the action of the spring $o''$, so that the carriage, F, is arrested after having moved over the distance of one space by the dog $o$ striking against the next succeeding one of the slats $j'$. The rack J is set by means of a sliding gage, O, to correspond to the number and length of the spaces in different stiles.

The operation is as follows: The points in which the two extreme holes are to come, being marked on the several stiles one of them, after the other is secured on the platform, H, by means of the clamp, I, and the carriage is moved back to a position represented in Fig. 2, so that the weight G is raised, and that one of the points marked on the stile is exactly under the auger in the spindle C. The distance between the extreme holes is now taken between the points of the gage O, and the rack is moved one way or the other by means of the hand wheel K, until the distance of the two points of the gage covers the required number of spaces on a line 1, 2, drawn through the center of the dog $o$ and parallel with the ways E. If the stile is to have nine tenon holes, for instance, the rack, J, is moved until the line 1, 2, is divided into eight equal parts by the slats $j'$, this line being equal to the distance of the two extreme holes, and to the distance of the points of the gage O. In this position the rack is secured by the set screws $l$. The treadle is now depressed, and the first hole is bored and as soon as the foot relaxes the dog $o$ is pulled down by the action of the pin $s$ on the nose $p'$ and the carriage is drawn along by the weight, G, until the next succeeding slat $j'$ strikes against the dog $o$ and the stile is in a position for the second hole. And after all the holes have thus been bored, the carriage F is pushed back by hand, the dog $o$ being of such a shape that it allows the motion of the carriage in one direction, but opposes it in the other, and the next stile is put in. If the spaces in this stile are to be different from the one having just bored, the rack is set again, and the boring is done in the same manner.

It is obvious that this machine can be used with equal advantage for spacing all sorts of timber or other articles, and if used in combination with a mortising machine the mortices which are made in the stiles, where the blind slats are to be stationary, can be cut in at the proper places in the same manner as the holes are bored with the boring machine.

What I claim as new and desire to secure by Letters Patent is:—

1. The rack J, or its equivalent arranged in combination with the sliding carriage F and with the dog $o$, substantially as and for the purpose herein described.

2. The lever M, arranged with the nose $p'$ in such relation to the treadle D, that by its action the dog $o$ is operated, substantially in the manner and for the purpose specified.

DANIEL DUNHAM.

Witnesses:
ROYAL LEE,
EDWIN S. SWEET.